March 17, 1970  A. G. MOORE  3,500,691

ANGULAR MOVEMENT SENSING DEVICE

Filed April 20, 1967  2 Sheets-Sheet 1

ALVIN G. MOORE
*INVENTOR.*

BY *Edward L. Bell*

ATTORNEY

United States Patent Office 3,500,691
Patented Mar. 17, 1970

3,500,691
ANGULAR MOVEMENT SENSING DEVICE
Alvin G. Moore, Cumberland, Md., assignor to Hercules Incorporated, Wilmington, Del., a corporation of Delaware
Filed Apr. 20, 1967, Ser. No. 632,239
Int. Cl. G01p 15/00
U.S. Cl. 73—516                                   11 Claims

ABSTRACT OF THE DISCLOSURE

The present invention relates to an angular movement sensing device of the type wherein angular movement is indicated by deflection of a fluid jet relative to a sensing means and is characterized primarily in that the jet has laminar flow, is enclosed within a sensor sleeve that is dimensioned relative to the jet to dampen the same, may also be enclosed within a housing to provide a closed fluid system, and has a sensing means comprising a pair of spaced thermistors adapted to be acted upon by the fluid and to respond to deviations of the jet imposed by angular movement of the device.

---

The present invention relates to a device for sensing the direction and rate of angular movement and particularly to sensing device of the fluid jet type wherein the direction and rate of angular movement are indicated by the direction and amount of deviation of the jet from symmetry relative to a sensing means.

The primary object of this invention is to provide an angular movement sensing device of the fluid jet type having improved sensitivity, i.e., sensitivity in the order of 0.001 degree of turn per second or less. Further objects of this invention are to provide such a device having improved precision and minimal "noise" in its response, has a substantially linear response over its designed range, has improved responsiveness or a minimum of lag or delay between an increment of turn and the response thereto by the unit, is affected minimally by temperature variations, and by forces induced by acceleration and by extraneous lateral movements, is resistant to mechanical damage by way of vibration and shock, has minimum power requirements for operation, is very simple in construction and operation and thus has a very long useful life without requiring service, e.g., five years or more, is highly reliable, is lightweight and compact, is relatively inexpensive, is substantially undamaged if overloaded and will quickly recover without residual error or memory when restored to normal operation.

The above objects have been attained in accordance with this invention basically by providing in an angular movement sensing unit of the fluid jet type, means for establishing laminar flow in the jet. A further feature of this invention is to provide what is herein termed a jet-enclosing or sensor sleeve that surrounds and is dimensioned relative to the fluid jet to effect a damping thereof but without being so close to the jet that it will impose a frictional drag that would slow or tend to dissipate the jet or affect its responsiveness. The prescent invention also contemplates a closed system wherein there is provided pump means for generating the fluid jet and for returning the fluid exhausted from the jet to the pump means whereby the unit can be isolated from outside influences such as pressure or temperature and can be used with specifically selected fluids. It is also a feature of this invention to provide specific sensing means, that is, the element upon which the jet impinges and upon which the impingement varies from a symmetrical arrangement in response to angular motion of the unit, which sensing means provides very precise and rapid response.

The preferred embodiments of the invention are hereinafter described with reference to the accompanying drawings, in which.

Figure 1:
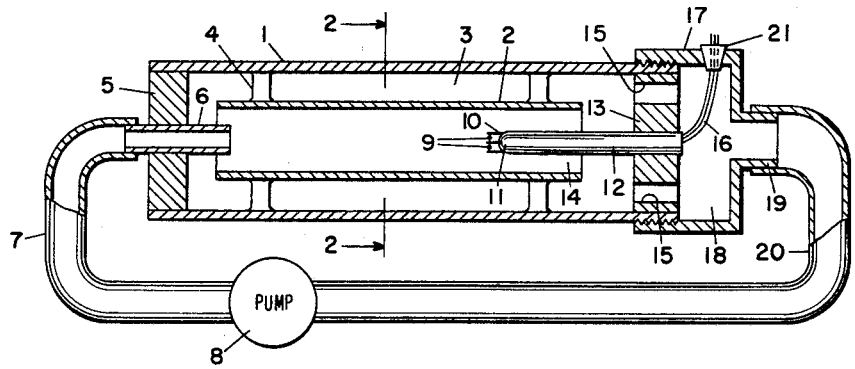
FIG. 1 is a schematic illustration in section of a unit embodying the present invention.
Figure 2:
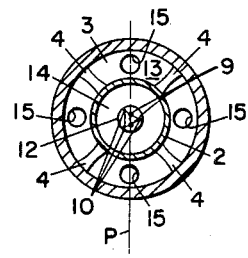
FIG. 2 is a sectional view taken substantially on the line 2—2 of FIG. 1.

With reference to the drawings FIGS. 1 and 2, there is illustrated an angular rate sensor of the fluid jet type in which there is provided an outer housing sleeve 1 having a jet-enclosing or sensor sleeve 2 disposed internally of and coaxial with the housing sleeve 1, and is disposed in spaced relation thereto to provide an annular space 3 between the same. The sensor sleeve 2 may be supported for example by means of braces 4 as shown.

The housing sleeve 1 is closed at one end by a plug 5 having an axial bore in which is secured a nozzle 6. The nozzle 6 is aligned co-axially with the sensor sleeve 2 and is designed to discharge a jet of fluid into the sensor sleeve 2. At its input end externally of the housing sleeve 1, the nozzle 6 is connected by a conduit 7 with the output of a pump 8.

At the end of the sensor sleeve 2 opposite from the nozzle 6 there is mounted what is herein termed the sensing means, that is, the means upon which the fluid jet discharged from the nozzle 6 inpinges. In the usual manner with fluid jet type angular movement sensing devices, the response is generated by movement of the sensing means relative to the discharge end of the nozzle 6 during the period of time that an increment of fluid is in transit from the nozzle 6 to the sensing means. This relative motion is manifested by an inpingement of that increment of fluid in a non-symmetrical manner upon the sensing means. The amount of displacement of the fluid jet relative to the sensing means is proportional to the angular rate of movement and the device can accordingly be calibrated to indicate angular rate of movement.

The sensing means in accordance with the embodiment of the invention illustrated in FIGS. 1 and 2 comprises a pair of thermistors 9 carried by posts 10 at the free end 11 of a support 12. The support 12 is mounted in a plug 13 that closes the end of the housing sleeve 1 opposite from plug 5 and is arranged substantially co-axially of the sensor sleeve 2 with its free end 11 extending into the sleeve 2. The free end 11 is preferably rounded to provide for a smooth flow of the jet thereof while the support 12 itself is sufficiently smaller in cross section than the inner diameter of the housing sleeve 1 to provide an annular space 14 between the two. There are exhaust ports 15 in the plug 13 to provide for escape from the housing sleeve 1 of the fluid delivered by the nozzle 6. The thermistors 9 are adapted to be heated, which may be for example as illustrated in FIG. 4, by electrical power supplied through leads 16 that extend through the support 12 to the posts 10, to operating temperatures established by equilibrium of the circuit.

In order to provide a closed system in the illustrated device, the end of the housing sleeve 1 adjacent to the plug 13 may be closed by a cap 17 having an end wall that is spaced from the plug 13 and defines with the plug 13 a fluid chamber 18 that collects the exhaust fluid from the ports 15 and is connected by a coupling 19 and a conduit 20 to the intake of the pump 8. The leads 16 in this case may be directed outwardly of the chamber 18 through an insulating plug 21 that seals the aperture in the cap 17 through which the leads 16 are run.

In the normal operation of the device as illustrated in FIGS. 1 and 2, the pump 8 supplies fluid under pressure through the conduit 7 to the nozzle 6 from which it is discharged as a fluid stream. The fluid stream passes through the sensor sleeve 2 and impinges upon the thermistors 9 with the nozzle 6 being arranged relative to the thermistors so that the fluid stream is directed symmetrically upon the thermistors in the at-rest state of the device. With the stream thus impinging equally upon the two thermistors and producing an equal cooling of the same, the heating circuits for the thermistors are in equilibrium and are balanced. Upon an angular movement of the device, the fluid stream is deflected to a non-symmetrical impingement upon the two thermistors and produces an unequal cooling of them. As the thermistors are cooled, their electrical resistance increases and their heating circuits are thus thrown out of balance. A measurement of the unequal power required to maintain the two thermistors at equilibrium temperature indicates the amount of deflection of the jet and, through the proportional relation of the deflection of the jet to the rate of angular movement, also indicates the rate of angular movement. The direction of angular movement is indicated by the relative cooling of the two thermistors, that is, increased cooling of the one bead indicates angular movement in the plane of sensitivity in the direction of the opposite bead.

Figure 4:
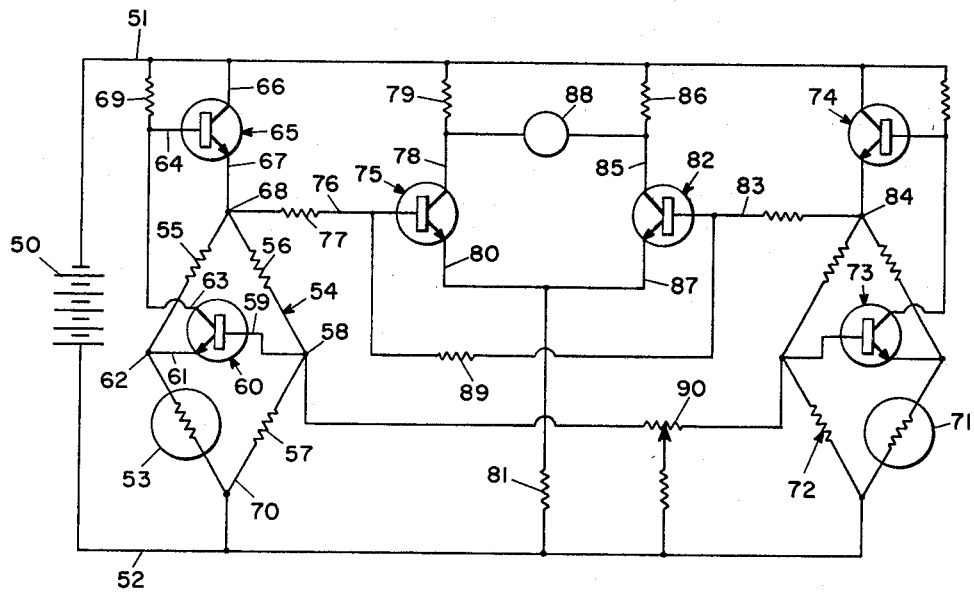
FIG. 4 is a circuit diagram of an electrical circuit for use in the unit of FIG. 1.

In FIG. 4 there is illustrated schematically an electrical circuit for heating the thermistors 9 and for indicating the direction and rate of angular movement. In the illustrated circuit, the battery 50 represents a source of electrical power, that is supplied to the circuit through a power lead 51 and a ground lead 52. The thermistor 53 at the left in FIG. 4 is connected in one leg of a bridge 54 along with a resistor 55. The other leg of the bridge 54 consists of two resistors 56 and 57 that correspond respectively to the resistor 55 and the thermistor 53. The bridge terminal 58 between the resistors 56 and 57 is connected to the base lead 59 of a control transistor 60 while the emitter lead 61 thereof is connected to the bridge terminal 62 between the thermistor 53 and resistor 55. The collector lead 63 of the transistor 60 is connected to the base lead 64 of a power transistor 65 which has its collector lead 66 connected to the power lead 51 and its emitter lead 67 connected to the input terminal 68 of the bridge 54. The collector lead 63 of the control transistor 60 and the base lead 64 of the power transistor 65 are connected to the power lead 51 through a resistor 69. The output terminal 70 of the bridge 54 is connected to the ground lead 52.

At the opposite side of the circuit, there is illustrated the second thermistor 71 that is connected in the same manner as the thermistor 53 to a bridge 72, a control transistor 73 and a power transistor 74. Inasmuch as the connections and the function and operation of the circuit for the thermistor 71 is the same as that of the thermistor 53, the above description of the connections and the following description of the function and operation of the circuit for the thermistor 53 will also serve as descriptions applicable to the thermistor 71.

In operation, electrical power is supplied from the power lead 51 through the resistor 69 to the base lead 64 of the power transistor 65 so that the transistor 65 then begins to conduct and voltage is applied to the input terminal 68 of the bridge 54. At this time, the base voltage on the control transistor 60 is less than the voltage at the emitter lead 61 and bridge terminal 62 so the transistor 60 is not conducting. With power in the bridge 54, the thermistor 53 begins to heat and its resistance begins to fall. As the current in the thermistor leg of the bridge 54 thus increases, the voltage drop across the resistor 55 increases until the voltage at the bridge terminal 62, together with the voltage drop, if any, across the control transistor 60, is equal to the voltage at the bridge terminal 58. At this point, the control transistor 60 begins to conduct and to lower the voltage on the base 64 of the power transistor 65. The power supplied from the power lead 51 through the collector and emitter of the transistor 65 to the input terminal 68 of the bridge 54, is thus reduced until an equilibrium is established, that is, until the current in the thermistor leg of the bridge 54 is adequate only to generate heat in the thermistor at a rate that matches the rate at which the heat is dissipated from the the thermistor. The bridge circuit 54 is thus balanced and will remain in balance.

With the bridge 54 in equilibrium, when the jet impinging upon the thermistor 53 shifts in a direction to increase the rate at which heat is dissipated from the thermistor, the thermistor tends to cool and thus to increase in resistance. Instantaneously, the current in the respective leg of the bridge 54 is reduced with a corresponding increase in voltage at the bridge terminal 62. As emitter voltage at the control thermistor 60 is thus increased, the control current is reduced and the voltage at the base lead 64 of the power transistor 65 is increased, whereby the voltage is raised at the input terminal 68 of the bridge 54 and there is a corresponding increase of the voltage at the bridge terminals 58 and 62 and of the current flow in the bridge. The power supplied to the thermistor and the resulting heat are thus increased to maintain the thermistor at its equilibrium temperature at the new and increased heat dissipation rate. When the jet impinging upon the thermistor 53 shifts in the direction to decrease the rate at which heat is dissipated from the thermistor 53, the circuit has an opposite reaction.

The output of the device, which may be by way of a meter or a directly-usable control signal, is taken by comparing the voltage at the input terminal 68 of the bridge 54 with that at the corresponding terminal of the bridge 72. As illustrated, this is accomplished through an output transistor 75 having a base lead 76 connected through a resistor 77 to the input terminal 68 of the bridge 54. The collector lead 78 of the transistor 75 is connected to the power lead 51 through a resistor 79 while the emitter lead 80 is connected to the ground lead 52 through a resistor 81. The input terminal 84 of the bridge 72 is also connected to a comparable output transistor 82 having its base lead 83 connected to the input terminal 84 of the bridge 72, having its collector lead 85 connected to the power lead 51 through a resistor 86, and having its emitter lead 87 connected to the ground lead 52 through the resistor 81. The output, indicated at 88, is connected across the collector leads 78 and 85 of the transistors 75 and 82.

To establish the range of the circuit, that is, to control the output signal obtained with respect to a given variation in the voltage at the input terminals of the bridges 54 and 72, there may be provided a resistor 89 connected at its opposite ends to the base leads 76 and 83 of the output transistors 75 and 82.

Zero adjustment of the output 88, that is, to balance the voltage across the output 88 when the jet is centered relative to the thermistors, there is provided an adjustable resistor 90 that is adapted to adjust the voltage at the bridge terminals connected to the base of the control transistors, that is, the terminal 58 and the corresponding terminal of the bridge 72.

A primary feature of this invention is in the use of a fluid jet with laminar flow whereby a linear response and high sensitivity is obtained with minimum power requirements. The linearity of the response is obtained through the elimination of turbulence or so-called "noise" which produces an erratic response, and through the characteristics of the jet which provide for spacing the thermistors relative to the centerline of the jet whereby the cooling effect of the jets on the thermistors will have a linear relation.

Laminar flow is present in a jet when the Reynolds number of the jet is below a value of about 2000, the Reynolds number being defined by the following formula:

$$N = \frac{6.32w}{dv}$$

wherein $w$ is the flow rate of the fluid in pounds per hour, $d$ is the diameter of the nozzle and $v$ is the viscosity of the fluid in centipoise.

Figure 5:
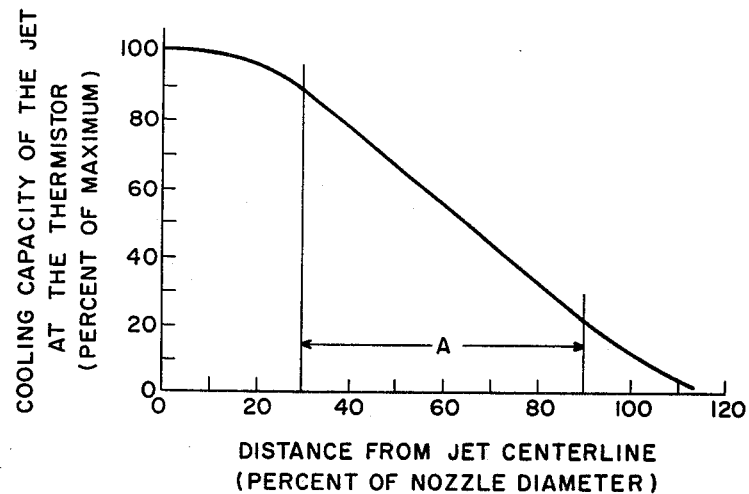
FIG. 5 is a graphical illustration of the profile of a fluid jet with laminar flow.

There is illustrated in FIG. 5 one-half of the cooling profile of a typical jet having laminar flow, that is, the portion of the jet in one direction outwardly from the centerline of the jet. The illustrated profile is that of a jet of air at room temperature (20° C.) discharged from a 0.140 inch nozzle at the rate of two cubic feet per hour. Such a jet has a velocity of about 100 inches per second and a Reynolds number of about 400. The illustrated profile is at two inches from the nozzle. As shown, the cooling profie is substantially bell-shaped, that is, it has its maximum cooling capacity at the centerline of the jet, and a diminishing cooling capacity outwardly from the centerline with the rate of change initially proceeding at an increasing rate, than at a uniform rate, and finally at a decreasing rate that tapers off toward zero. While there is some dissipation of the jet over the two inch range, it will be seen that, for the illustrated jet, the cooling capacity of its diverges to more than twice the diameter of the jet at the nozzle. In particular, outwardly from the jet centerline at a distance equal to the radius of the jet at the nozzle, the cooling capacity is about seventy percent of the maximum cooling capacity, and at a distance of about one hundred and twenty percent of the nozzle diameter outwardly from the centerline of the jet, the velocity is substantially zero.

The range in which the jet cooling diminishes in the illustrated example at a substantially uniform rate, which appears in the curve of FIG. 5 as a substantially straight sloping line, occurs at about thirty to ninety percent of the nozzle diameter outwardly from the centerline of the jet, that is, the area designated by the area A. Accordingly, within this range, the cooling effect imposed by the jet upon the thermistor is directly proportional to the location of the thermistor relative to the cetnerline of the jet. The range of uniformly diminishing velocity designated by the area A defines an annular area about the centerline of the jet. Both of the thermistors are located substantially at the mid-point within this linear portion of the jet or at a distance of about sixty percent of the nozzle diameter outwardly from the jet centerline. As an example, with the device dimensioned as noted above, i.e., with a nozzle diameter of 0.140 inch and a range of two inches, the thermistors are spaced apart a distance one hundred and twenty percent of the nozzle diameter or about 0.165 inch. Since the sensitivity or responsiveness of the device is a function of the time required for an increment of fluid to travel from the nozzle to the sensing means, which time determines the total lateral displacement of the sensing means relative to the nozzle within a given period of time and is itself a function of the jet velocity and the distance from the nozzle to the sensing means, the device can readily be calibrated to produce the desired range of response, for example, turns of up to plus or minus twenty degrees per second, with a jet deflection relative to the thermistors that is within the linear cooling range of the jet.

In addition to the advantage of improved linearity in its response by the elimination of noise or turbulence, the use of a laminar flow jet also has the further advantages of minimizing power requirements by using the jet more efficiently. The device is thus better adapted for portability or for applications where weight and power requirements are critical.

A further feature of the present invention is in the use of the sensor sleeve 2. The dynamics of a jet are such that when there is relative movement between the jet and the sening means in response to a turn, there is a tendency to "hunt," that is, to over-shoot and then, upon recovery to the correct position, to overshoot by a reduced amount in the opposite direction, and to continue this process until it comes to rest in the correct position. However, hunting produces an erratic response and requires time for the device to come to rest at the correct position, all of which, of course, constitutes a problem that is aggravated in a turn at a varying rate of angular movement. The sensor sleeve 2 dampens the deflection of the jet and tends to eliminate hunting. If the sensor sleeve 2 were too close to the periphery of the jet in either of the extreme lateral positions of the jet relative to the sensing means, it would impose a frictional drag upon the jet and thus tend to slow and to dissipate the same. It has been found that in a device having dimensions as discussed above, i.e., a nozzle diameter of 0.140 inch and a two inch spacing between the nozzle and the sensing means, a sleeve diameter of about four to six times the nozzle diameter is preferred. A sleeve diameter of only about three times the nozzle diameter overdamps the jet and thus disrupts responsiveness while a sleeve diameter in excess of about six times the nozzle diameter fails to dampen the jet effectively.

As pointed out in the application of W. C. Schuemann, Ser. No. 632,238, filed Apr. 20, 1967, and assigned to the same assignee as this application, with the sensor sleeve 2, there is a tendency to establish a counterflow of fluid in the annular space between the jet and the wall of the sleeve, which counterflow apparently results from the entrainment of the fluid in the sleeve by the jet and the resulting reduced pressure that tends to draw fluid inwardly along the wall of the sleeve. This counterflow of fluid tends to dissipate the jet and to generate noise by disrupting the flow of the jet over the sensing means. To avoid the counterflow, the sensor sleeve 2 is open or vented at its input end, that is, about the nozzle 6. Thus, the reduced pressure that tends to form in the sleeve 2 is dissipated by fluid that enters the sleeve about the nozzle 6. The counterflow or circulation of fluid that is set up in the device as illustrated in FIGS. 1 and 2 occurs in the annular space between the sleeves 1 and 2 and the jet is effectively shielded therefrom by the sleeve 2. Elimination of the counterflow of fluids in the sensor sleeve 2 produces a smooth and non-turbulent flow of the fluid over the sensing means.

The thermistors 9 tend to heat the fluid passing over them. Thus, the portion of the fluid that would be recirculated within the sensor sleeve 2 if the sleeve 2 were not vented at its input end or that would be recirculated through the annular space between the housing sleeve 1 and sensor sleeve 2 if the sleeve were vented as shown in FIGS. 1 and 2, and which fluid fills the sensor sleeve 2 about the jet, is at a higher temperature than the fluid of the incoming jet. Accordingly, the jet has a negative buoyancy in the sensor sleeve 2 which tends to deflect a horizontal pet vertically downward. The magnitude of such deflection is relatively small, e.g., in a device as disclosed wherein the jet emerges from a nozzle that is 0.140 inch in diameter and travels two inches, the thermistors raise the temperature of the fluid in the sensor sleeve 2 by slightly less than one degree centigrade and the resulting deflection is equivalent to that produced by a turn of about 0.1 degree per second.

Figure 3:
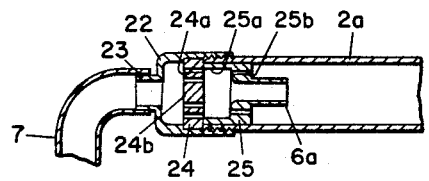
FIG. 3 is a fragmentary portion of the unit illustrated in FIG. 1, but embodying a modification of the invention.

Gravity-induced deflection can be reduced by filling the sensor sleeve 2 with the same fluid that is used for the jet so that the jet travels through fluid of the same temperature. Means for accomplishing this is illustrated in FIG. 3 wherein the housing sleeve 1 is eliminated and there is provided a cap 22 on the end of the sensor sleeve 2a and having a coupling 23 adapted to be connected to the conduit 7. The end of the sleeve 2a is closed by a plug 24 having a plurality of bores 24a arranged around the outer portion thereof whereby the central portion defines a baffle 24b. The baffle 24b eliminates the ram-effect of the incoming fluid and the bores 24a align the flow pattern thereof. Inwardly of the plug 24 there is provided a nozzle fitting 25 having the input end thereof counterbored to provide a chamber 25a. The fitting 25 carries the nozzle 6a and is provided with a plurality of bores 25b around the periphery of the nozzle 6a. With the nozzle constructed in this manner, the reduced pressure that results from the aspirating effect of the jet is dissipated by fluid supplied from the chamber 25a through the bore 25b rather than from a sleeve such as the housing sleeve 1. The fluid in the chamber 25a, being the same fluid that forms the jet, is at the same temperature as the jet and there is thus no buoyancy effect on the jet. The amount of fluid supplied through the bores 25b may for example be substantially equal to the amount of fluid in the jet.

The venting of the sensor sleeve 2 forms the subject matter of the above noted Scheumann application Ser. No. 632,238.

The term time-constant is herein used to indicate the elapsed time between the occurrence of an increment of turn and the generation of the indication or control signal in response to that increment of turn. In the illustrated device, the time-constant is a function of the time required for an increment of fluid to travel from the nozzle to the sensing means, to impose a differential cooling effect upon the thermistors and for the generation of a signal in response to that differential cooling effect. The transit time for the increment of fluid is determined by the jet velocity and the distance from the nozzle to the sensing means. The jet velocity is limited by laminar flow considerations but can otherwise be selected to satisfy other considerations. Accordingly, to provide a device having a pre-determined time-constant, allowance is made for the time required to obtain a measurable differential cooling effect, and the remaining portion of the pre-determined time is available for travel of the increment of air. Then, for a known desired distance from the nozzle to the sensing means, the required jet velocity can be readily calculated.

The spacing of the nozzle and the sensing means is limited by the deflection of the jet centerline relative to the thermistors in order to obtain a measurable differential cooling effect. For a given rate of turn, the deflection of the jet relative to the sensing means is a function of the time that an increment of fluid is in travel, that is, the longer the sensing means turn relative to the nozzle at a given rate, the further it will have turned, which time is, in turn, a function of the jet velocity and the spacing between the nozzle and sensing means. With a relatively large deflection, the flow differential over the thermistors is also relatively large with a correspondingly increased cooling differential between the two thermistors. Thus, there is obtained a maximum response or sensitivity but, at the same time, a large deflection of the jet for a given rate of turn consumes a greater portion of the linear area of the jet, that is, the area in which the jet cooling capacity diminishes at a uniform rate, and thus limits the range of the device. Therefore, there is also involved the sensitivity of the circuit, i.e., the amount of differential cooling of the two thermistors that is required to produce a desired response in the heating circuts for the thermistors.

All of these factors can be balanced in various combinations to produce specific desired effects. The combination herein described represents one specific example of a combination selected for very low power consumption, a full scale linear response of plus or minus 20 degrees of turn per second, a sensitivity of at least 0.001 degree of turn per second, and a time constant of 0.04 second.

Since the thermistors 9 in the embodiment of the invention illustrated in FIGS. 1 and 2 are mounted on the posts 10, the exposure and thus the responsiveness thereof to the jet is correspondingly high. However, the device is at the same time increasingly sensitive to mechanical failure caused by vibration or shock that tends to break the leads from the thermistors to the posts. For applications where vibration or shock or other mechanical forces are a factor, the thermistors can be mounted directly on the free end 11 of the support 12.

The fluid used in the device as disclosed in FIGS. 1 and 2 may be air at room temperature and atmospheric pressure. In this case, the cap 17 and the return conduit 20 may not be required but rather, the inlet of the pump 8 can be connected directly to the atmosphere and the air exhausted from the unit through the port 15 can be exhausted directly to the atmosphere. This arrangement, while economical, may not always be available since the temperature of the fluid is a factor in the cooling effect of the jet upon the thermistors and the device is therefore calibrated generally for particular operating conditions. In applications where the atmospheric conditions involved in the operating environment change significantly or are inappropriate, the closed system represented by the cap 17 and the conduit 20 can be used to isolate the device from its environment. Within the closed system, the temperature and pressure of the fluid can be maintained at the desired values by any suitable means (not shown). The closed system also permits use of a fluid other than air that is selected for some desired property.

The present device is herein described as an annular movement sensing device since the primary utility of the device will be found in applications wherein the motion to be sensed is angular motion about an axis of sensitivity that is normal to a plane P in FIG. 2, that is, the plane defined by the centerline of the jet and the thermistors 9, which plane P may for convenience be referred to as the plane of sensitivity. This axis of sensitivity may intersect the plane P at any point, whether along the centerline of the jet within or beyond the ends of the sleeve 2 or at any point spaced from the centerline of the jet.

The device in accordance with this invention is affected minimally by movement in a direction aligned with the centerline of the jet. Inasmuch as there is no relative motion between the nozzle and sensing means along this axis, motion at a steady rate along this axis would not alter the response. Acceleration or deceleration along this axis would decrease or increase respectively the effective distance that an increment of air in the jet would have to travel from the nozzle to the sensing means and would therefore have some effect upon the response. This effect however is negligible since the change in the effective distance in the very short period of time involved is so small. In any event, a change in effective distance would affect only the responsiveness of the instrument since it would only add or subtract an increment of time within which an increment of fluid would be in transit and thus subject to lateral displacement relative to the sensing means. Acceleration or deceleration of the device in a direction normal to the centerline of the jet would cause a limited deflection of an increment of air laterally of the sensing means. The effect of any acceleration or deceleration of the unit in any direction other than normal to or aligned with the centerline of the jet is a function of the acceleration or deceleration component in each of those directions. Any movement such as translation of the device in any direction that does not involve relative motion between the nozzle and the sensing means would constitute a steady state condition locally within the device which would have no affect upon the response.

Figure 6:
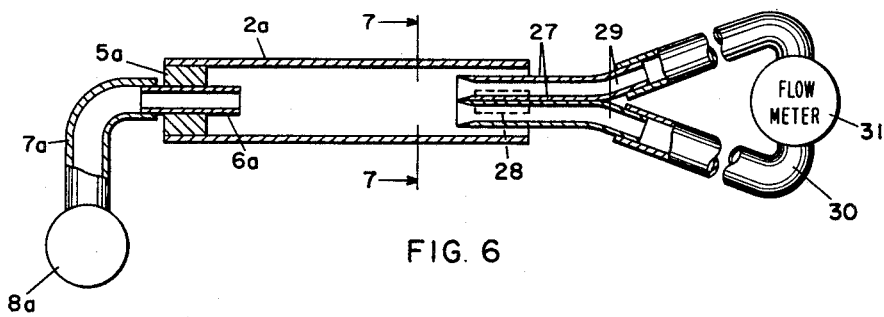
FIG. 6 is a view similar to FIG. 1 and illustrating a modified embodiment of the invention.
Figure 7:
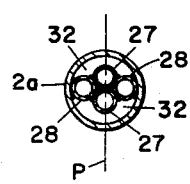
FIG. 7 is a sectional view taken substantially on the line 7—7 of FIG. 6.

With reference to FIGS. 6 and 7, there is illustrated a further embodiment of the invention which comprises a sensor sleeve 2a closed at the one end by a plug 5a through which extends the nozzle 6a. Fluid is supplied to the nozzle 6a by a pump 8a having the output thereof connected to the nozzle 6a by a conduit 7a. The sensing means at the opposite end of the sleeve 2a comprises a pair of open-ended receiver tubes 27 that resemble pitot tubes and that are supported centrally of the sleeve 2a as by a pair of support tubes 28 secured to the inside of the sleeve 2a as well as to each of the receiver tubes 27. The nozzle 6a and the receiver tubes 27 are arranged symmetrically within the sleeve 2a.

Outwardly of the sleeve 2a, the receiver tubes 27 are bent to provide diverging output end portions 29 received within the opposite end portions of a conduit 30 that defines a closed path between the output end portions 29 of the receiver tubes 27. A bi-directional flow meter 31 is coupled to the conduit 30 for sensing the direction and the rate of flow of fluid in the conduit.

In operation, fluid such as air is delivered to the nozzle 6a by the pump 8a through the conduit 7a and is discharged at the output end as a jet that is directed symmetrically onto the input end of the receiver tubes 27. The fluid is delivered at a rate such as to form a jet with laminar flow and at velocity to produce the desired responsiveness. The jet impinges equally upon both of the receiver tubes 27 and, when the device is at rest, creates an equal dynamic pressure in each. There is thus no flow in the conduit 30. The air that is discharged by the nozzle 6a is exhausted from the sleeve 2a through the support tubes 28 and through the open areas 32 between the sensor sleeve 2a and the receiver tubes 27 and support tubes 28.

Whenever there is movement of the receiver tubes 27 relative to the nozzle 6a in the plate P, FIG. 7, during the period of time required for an increment of fluid in the jet to travel from the nozzle 6a to the receiver tubes, that increment of fluid will be off-center relative to the receiver tubes by an amount equal to the distance that the receiver tubes have moved while the increment of air was in transit. There is thus produced an unequal pressure in the receiver tubes 27 that in turn produces a flow of fluid in the conduit 30 past the flow meter 31. The magnitude and direction of the movement is proportional to the direction and volume of flow in the conduit 30, and this flow is measured by the flow meter 31 which may have an output connected to an indicator calibrated to read degrees of turn per second, for example, or to a control mechanism for performing a control function such as to control a driving motor to compensate for the turn.

The receiver tubes 27 as herein illustrated are, for convenience, in the form of tubes, but it will be apparent that other configurations which would utilize a greater portion of the jet would increase responsiveness. In particular, the receiver tubes could have D-shaped cross sections with their flat sides juxtaposed to define a combined outline that is substantially circular. To avoid turbulence at the input of the receiver tubes, the lips thereof could be beveled inwardly to present a sharp edge to the jet.

The primary advantages of the embodiment of the invention illustrated in FIGS. 6 and 7 is that it is capable of using any existing commercial bi-directional flow meter or, since it is wholly fluid, could be used in a fluidic circuit wherein fluidic components are used to amplify the flow in the conduit 30 to a magnitude sufficient to actuate an indicator or gauge or to perform a control function.

While the device as herein disclosed is designed to respond to movement in a single plane of sensitivity, it will be apparent that it could also be made sensitive to movement in a second plane of sensitivity that is normal to the first plane of sensitivity. By integrating the components of motion in each of these two planes, the device would be sensitive to movement in all planes through the centerline of the jet.

What I claim and desire to protect by Letters Patent is:

1. A unit for sensing the direction and rate of angular movement of a body in a plane of sensitivity comprising a sensor sleeve, a nozzle mounted in said sensor sleeve and directed longitudinally along the axis thereof, fluid delivery means for delivering fluid under pressure to said nozzle at a flow rate to produce a laminar flow fluid jet discharged from said nozzle, sensing means in said sensor sleeve spaced from said nozzle a distance at which said fluid jet will oscillate upon deflection and arranged symmetrically relative to the fluid jet, said sensor sleeve having a smooth wall about said sensing means and a transverse dimension at said sensing means that is four to six times the transverse dimension of said nozzle wherey the deflection of the fluid jet will be damped by said sleeve means, said sensing means responding to deviations of said fluid jet from symmetry relative thereto induced by movement of said unit about an axis of sensitivity that is normal to the plane of sensitivity.

2. A unit in accordance with claim 1 in which said fluid is a gas and the Reynolds number of the fluid jet is about 400.

3. A unit in accordance with claim 1 in which said sensor sleeve has an internal diameter that is substantially constant from said nozzle to said receiver.

4. A unit in accordance with claim 1 in which there is provided conduit means for receiving the exhaust fluid from the end of said sensor sleeve at said sensing means and for conducting the same to the input of said fluid delivery means whereby there is provided a closed circuit for the fluid.

5. A unit in accordance with claim 1 in which said sensing means comprises a pair of receiver tubes having the input ends thereof disposed symmetrically relatively to said fluid jet and having the output ends thereof interconnected by a conduit, and said sensing means responds to the direction and velocity of the fluid flow in said conduit.

6. A unit for sensing the direction and rate of angular movement of a body in a plane of sensitivity comprising a sensor sleeve, a nozzle mounted in said sensor sleeve and directed longitudinally thereof, fluid delivery means for delivering fluid under pressure to said nozzle at a flow rate to provide a laminar flow fluid jet discharged from said nozzle, a pair of temperature sensitive elements, support means for mounting said elements in said sensor sleeve spaced from said nozzle and arranged symmetrically relative to the fluid jet in the plane of sensitivity, said elements responding to deviations of said fluid jet from symmetry relative thereto induced by movement of said unit about an axis of sensitivity that is normal to the plane of sensitivity.

7. A unit in accordance with claim 6 in which said temperature sensitive elements are spaced from each other a distance relative to the cross section of the fluid jet whereby, within the designed range of the unit, each element is disposed within the jet as it is deflected relative thereto within a portion of the jet having uniformly varying cooling capacity.

8. A unit in accordance with claim 7 in which said temperature sensitive elements comprise thermistors electrically heated through a bridge circuit to an equilibrium temperature and whereby the direction and rate of annular movement is indicated by the differential power requirements for maintaining said thermistors at equilibrium temperature because of the differential cooling thereof by the fluid jet.

9. A unit in accordance with claim 6 in which said sensing elements are normally disposed on opposite sides of the centerline of said fluid jet and in the range of linear variation in the velocity of said jet.

10. A unit in accordance with claim 9 in which said sensing elements are normally disposed at substantially and midpoint of the range of linear variation in the velocity of said jet.

11. A unit in accordance with claim 10 in which said sensing elements are spaced from said nozzle a distance relative to the velocity of said jet whereby the cooling capacity of the jet at the sensing elements extends laterally in all directions from the centerline of the jet a distance about equal to the diameter of said nozzle.

References Cited

UNITED STATES PATENTS

| 3,163,048 | 12/1964 | Siegmund et al. | 73—516 |
| 3,205,715 | 9/1965 | Meek | 73—516 |
| 3,241,374 | 3/1966 | Menkis | 73—516 X |
| 3,310,985 | 3/1967 | Belsterling et al. | 73—515 |
| 3,351,080 | 11/1967 | Datwyler et al. | 73—505 X |

VERLIN R. PENDEGRASS, Primary Examiner